(12) United States Patent
Regev et al.

(10) Patent No.: US 12,726,590 B2
(45) Date of Patent: Sep. 1, 2026

(54) CONTENT STREAM DISTRIBUTION FOR VIDEOCONFERENCING VIA DYNAMIC MESH TECHNOLOGY

(71) Applicant: Zoom Video Communications, Inc., San Jose, CA (US)

(72) Inventors: Adi David Regev, Fair Lawn, NJ (US); Alexander Shneyderman, Wayne, NJ (US); Nicholas Alexander Sieracki, Sylmar, CA (US); Michael Adrian White, Alpine, UT (US)

(73) Assignee: Zoom Communications, Inc., San Jose, CA (US)

( * ) Notice: Subject to any disclaimer, the term of this patent is extended or adjusted under 35 U.S.C. 154(b) by 117 days.

(21) Appl. No.: 18/243,720

(22) Filed: Sep. 8, 2023

(65) Prior Publication Data

US 2025/0088607 A1 Mar. 13, 2025

(51) Int. Cl.
*H04N 7/15* (2006.01)
*H04N 7/14* (2006.01)

(52) U.S. Cl.
CPC ............. *H04N 7/152* (2013.01); *H04N 7/147* (2013.01)

(58) Field of Classification Search
CPC ............................... H04N 7/152; H04N 7/147
See application file for complete search history.

(56) References Cited

U.S. PATENT DOCUMENTS 7,096,493 B1 8/2006 Liu
8,489,442 B1 7/2013 Mohler
8,917,847 B2 12/2014 Mai et al.
9,961,119 B2 5/2018 Bader-Natal et al.
9,967,403 B1 5/2018 Narayanaswamy
10,104,025 B2 10/2018 Beust
10,235,562 B2 3/2019 Shaburov et al.
10,680,899 B1 6/2020 Ibarra
(Continued)

FOREIGN PATENT DOCUMENTS

WO 2013/001276 A1 1/2013
WO 2024/091327 A1 5/2024

OTHER PUBLICATIONS

U.S. Appl. No. 17/211,130, “Advisory Action”, dated Jul. 20, 2022, 4 pages.

(Continued)

*Primary Examiner* — Amal S Zenati
(74) *Attorney, Agent, or Firm* — Kilpatrick Townsend & Stockton LLP

(57) ABSTRACT

Systems and methods for efficient distribution of video conferencing streams to client computing devices via dynamic mesh technology are provided. For example, a client computing device associated with a participant of a video conference joins the video conference. The video conference involves multiple participants each associated with respective client computing devices. The client computing device receives a message indicating the client computing device is a child node in a mesh network. The mesh network includes a parent node selected from the client computing devices and multiple child nodes. The client computing device streams a video stream for an active speaker of the video conference from the parent node and presents the video stream in a user interface of the video conference on the computing device.

20 Claims, 9 Drawing Sheets

(56) References Cited

U.S. PATENT DOCUMENTS

| | | | | |
|---|---|---|---|---|
| 11,558,257 | B1 | 1/2023 | Lyer et al. | |
| 11,689,591 | B2 | 6/2023 | Sieracki et al. | |
| 11,870,660 | B1 * | 1/2024 | Shneyderman | H04L 12/1877 |
| 11,921,970 | B1 | 3/2024 | Hoover et al. | |
| 11,979,444 | B1 | 5/2024 | Sieracki et al. | |
| 2001/0042073 | A1 | 11/2001 | Saether et al. | |
| 2002/0133611 | A1 | 9/2002 | Gorsuch et al. | |
| 2004/0133444 | A1 | 7/2004 | Defaix et al. | |
| 2007/0299710 | A1 | 12/2007 | Haveliwala | |
| 2008/0005733 | A1 | 1/2008 | Ramachandran et al. | |
| 2009/0024693 | A1 | 1/2009 | Achtermann et al. | |
| 2010/0251177 | A1 | 9/2010 | Geppert et al. | |
| 2011/0271212 | A1 | 11/2011 | Jones et al. | |
| 2012/0023265 | A1 | 1/2012 | Liao | |
| 2012/0254305 | A1 | 10/2012 | Malkin et al. | |
| 2013/0191485 | A1 | 7/2013 | Spencer | |
| 2016/0073059 | A1 * | 3/2016 | Bader-Natal | H04N 7/148 348/14.03 |
| 2019/0327103 | A1 | 10/2019 | Niekrasz | |
| 2019/0349212 | A1 | 11/2019 | Heins et al. | |
| 2020/0170057 | A1 | 5/2020 | Rakshit et al. | |
| 2020/0302817 | A1 | 9/2020 | Williams et al. | |
| 2020/0382618 | A1 | 12/2020 | Faulkner et al. | |
| 2020/0382745 | A1 | 12/2020 | Trenh et al. | |
| 2021/0383127 | A1 | 12/2021 | Kikin-gil et al. | |
| 2022/0247654 | A1 | 8/2022 | Springer | |
| 2023/0306117 | A1 | 9/2023 | Bower, III et al. | |

OTHER PUBLICATIONS

U.S. Patent Application No. 17/211, 130, “Final Office Action”, dated Jun. 7, 2023, 24 pages.

U.S. Patent Application No. 17/211, 130, “Final Office Action”, dated Apr. 15, 2022, 27 pages.

U.S. Appl. No. 17/211,130, “Non-Final Office Action”, dated Jul. 30, 2021, 20 pages.

U.S. Patent Application No. 17/211, 130, “Non-Final Office Action”, dated Oct. 11, 2022, 24 pages.

U.S. Appl. No. 17/515,488, “Notice of Allowance”, dated Jan. 25, 2023,.

Nagpure et al., “Eye Motion Detection Using Single Webcam for Person with Disabilities”, International Journal of Engineering Research & Technology, vol. 3, Issue 3, Mar. 2021, pp. 2199-2203.

Zhao et al., “Hand Detection Using Cascade of Softmax Classifiers”, Advances in Multimedia, vol. 2018, Jul. 2018, pp. 1-11.

International Search Report and Written Opinion for PCT/US2024/042229 mailed Oct. 30, 2024.

U.S. Appl. No. 18/143,123, “Notice of Allowance”, Jan. 8, 2024, 17 pages.

U.S. Appl. No. 18/243,840, “Non-Final Office Action”, May 8, 2025, 16 pages.

U.S. Appl. No. 18/243,840, “Final Office Action”, Nov. 26, 2025, 18 pages.

U.S. Appl. No. 18/652,209, “Final Office Action”, Feb. 19, 2026, 21 pages.

U.S. Appl. No. 18/652,209, “Non-Final Office Action”, Sep. 10, 2025, 17 pages.

* cited by examiner

CONTENT STREAM DISTRIBUTION FOR VIDEOCONFERENCING VIA DYNAMIC MESH TECHNOLOGY

FIELD

The present application generally relates to videoconferencing, and more particularly relates to content stream distribution for videoconferencing via dynamic mesh technology.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
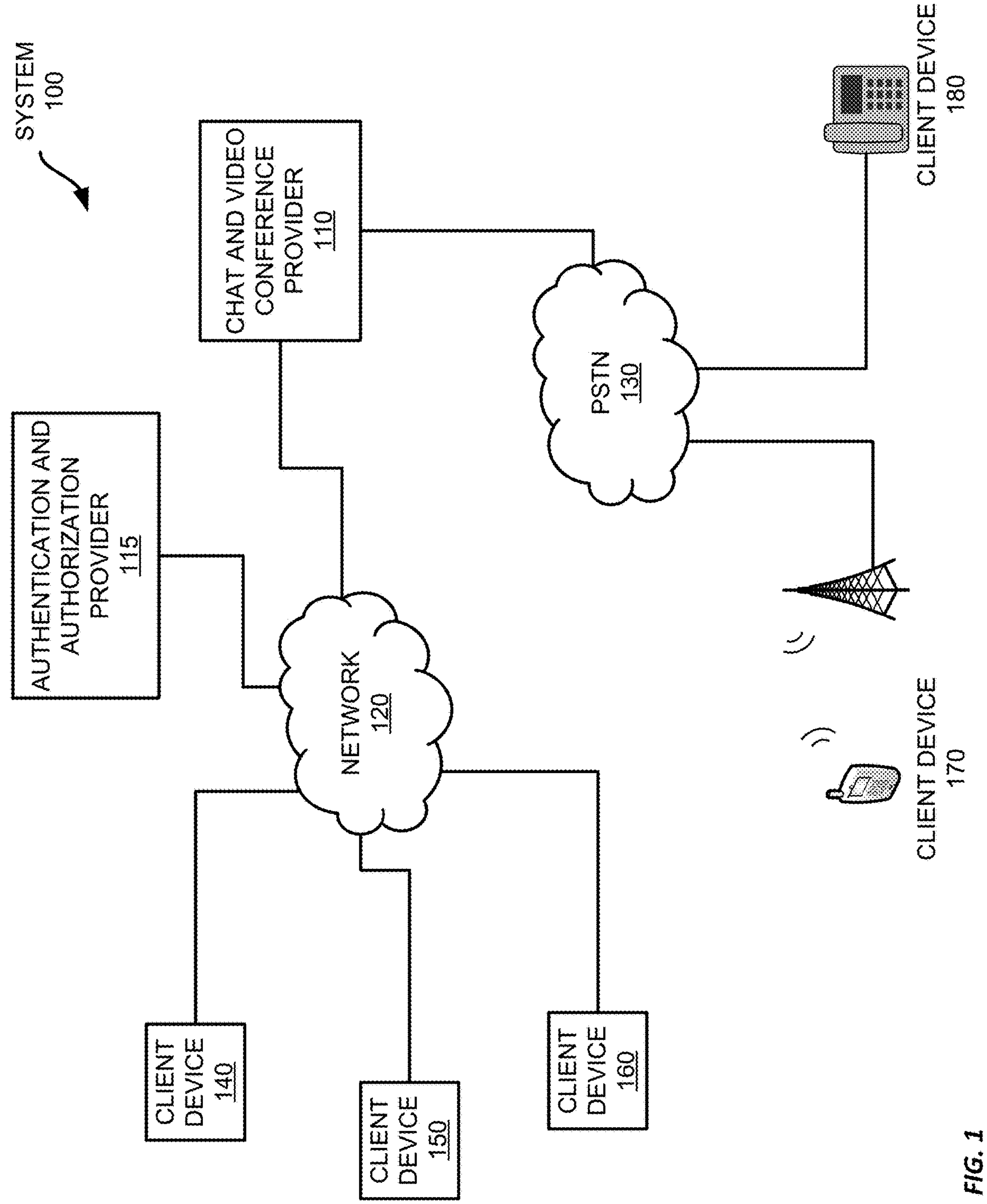
FIG. 1 shows an example system that provides videoconferencing functionality to various client devices, according to certain aspects described herein.

Examples are described herein in the context of systems and methods for efficient distribution of video conferencing streams to client computing devices via dynamic mesh technology. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

However, current videoconferencing technology requires each client computing device to obtain the streams of a video conference (e.g., the video and audio streams of each participant) directly from the media server via the site's Internet connection. As a result, organizations, especially those with large campuses, will consume substantial bandwidth when a video conference is being conducted.

To solve the above problems, example systems and methods for efficient distribution of videoconferencing streams to client computing devices via dynamic mesh technology are provided. As described herein, a mesh service is configured to establish one or more mesh networks for client computing devices associated with participants of an ongoing video conference. The client computing devices in each mesh network is determined to be in a same local network. For each mesh network, the mesh service further selects a client computing device as the parent node and the remaining client computing devices are the child nodes of the mesh network. The mesh service can notify the client computing devices in the mesh network their respective roles in the mesh network.

In some examples, the mesh network is utilized to efficiently distribute the media stream of the active speaker of the video conference. For example, once the video conference starts, the client computing device associated with each participant of the video conference can transmit the media streams of the corresponding participant to a media service configured to manage the streams of the video conference. The media streams can include a video stream containing the video of the participant, an audio stream containing the audio of the participant, and other streams. The media service can collect the media streams from the participants and distribute them to other participants based on the layout settings in respective client computing devices. For example, if the layout of a client computing device is set to an active speaker mode, the video of the active speaker is displayed with a high resolution in the center of the user interface for the video conference while the videos of other participants are displayed at the top or side of the user interface in a smaller resolution. As such, the client computing device can request a higher-resolution video stream for the active speaker and low-resolution video streams for other participants.

The mesh network can be utilized to distribute the media streams of the active speaker to the client computing devices. For instance, each child node that needs to obtain the active speaker media stream (i.e., the child node is not associated with the active speaker) can subscribe to the active speaker media stream with the parent node. Based on the subscriptions from the child nodes in the mesh network, the parent node can request all the subscribed media streams by its child nodes from the media service and distribute the media streams to the respective child nodes. For media streams of other participants, the child node is configured to stream them directly from the media service. This process continues throughout the duration of the video conference as active speakers change.

As the video conference is being conducted, one participant may start to share content with other participants. The shared content is transmitted in a content share stream which is common for all meeting participants. Thus, the mesh networks can be utilized to efficiently distribute the content share stream. To share the content, the client computing device associated with the participant who is sharing sends the content share stream to the media service. The media service sends the content share stream to the parent nodes in the respective mesh networks. Each of the parent nodes can redistribute the content share stream to its child nodes (except for the child node that is the sharing device). For overlay content, such as the markups, each client computing device can obtain it directly from the media service.

Each client computing device can combine the received streams including the active speaker media stream and non-active-speaker media streams, as well as the content share stream and overlay stream if content sharing is enabled. The client computing device renders the combined stream in the user interface of the video conference.

As described herein, certain embodiments provide improvements to stream distributions in videoconferencing by solving problems that are specific to online platforms. These improvements include more efficiently organizing client computing devices into mesh networks thereby utilizing the mesh peer-to-peer distribution to relay some of the videoconferencing streams to the respective child nodes. In this way, the bandwidth consumption in the network between the local network and the media service can be significantly reduced. For example, the active speaker media stream is typically streamed in high-resolution because some participants set the layout of the video conferencing user interface to be an active speaker mode where the active speaker media stream is rendered in a larger window. The active speaker media stream thus has a higher bit rate than other media streams and require more network bandwidth to transmit. By distributing the active speaker media stream via the mesh networks can thus reduce the network bandwidth consumption. In addition, by using mesh networks to distribute the content share stream, more network bandwidth savings can be achieved.

This illustrative example is given to introduce the reader to the general subject matter discussed herein and the disclosure is not limited to this example. The following sections describe various additional non-limiting examples and examples of systems and methods for efficient distribution of videoconferencing streams to client computing devices via dynamic mesh technology.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
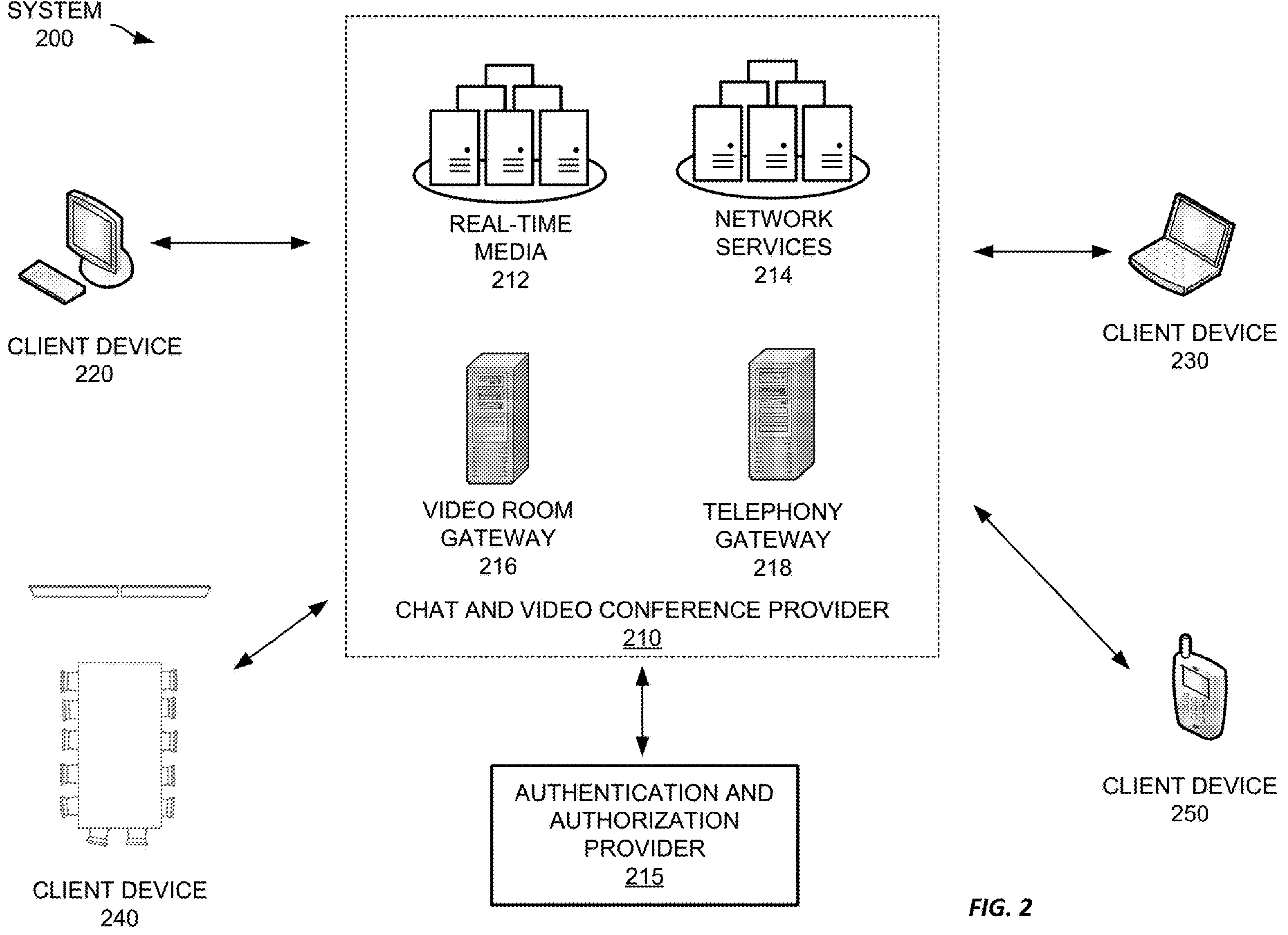
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
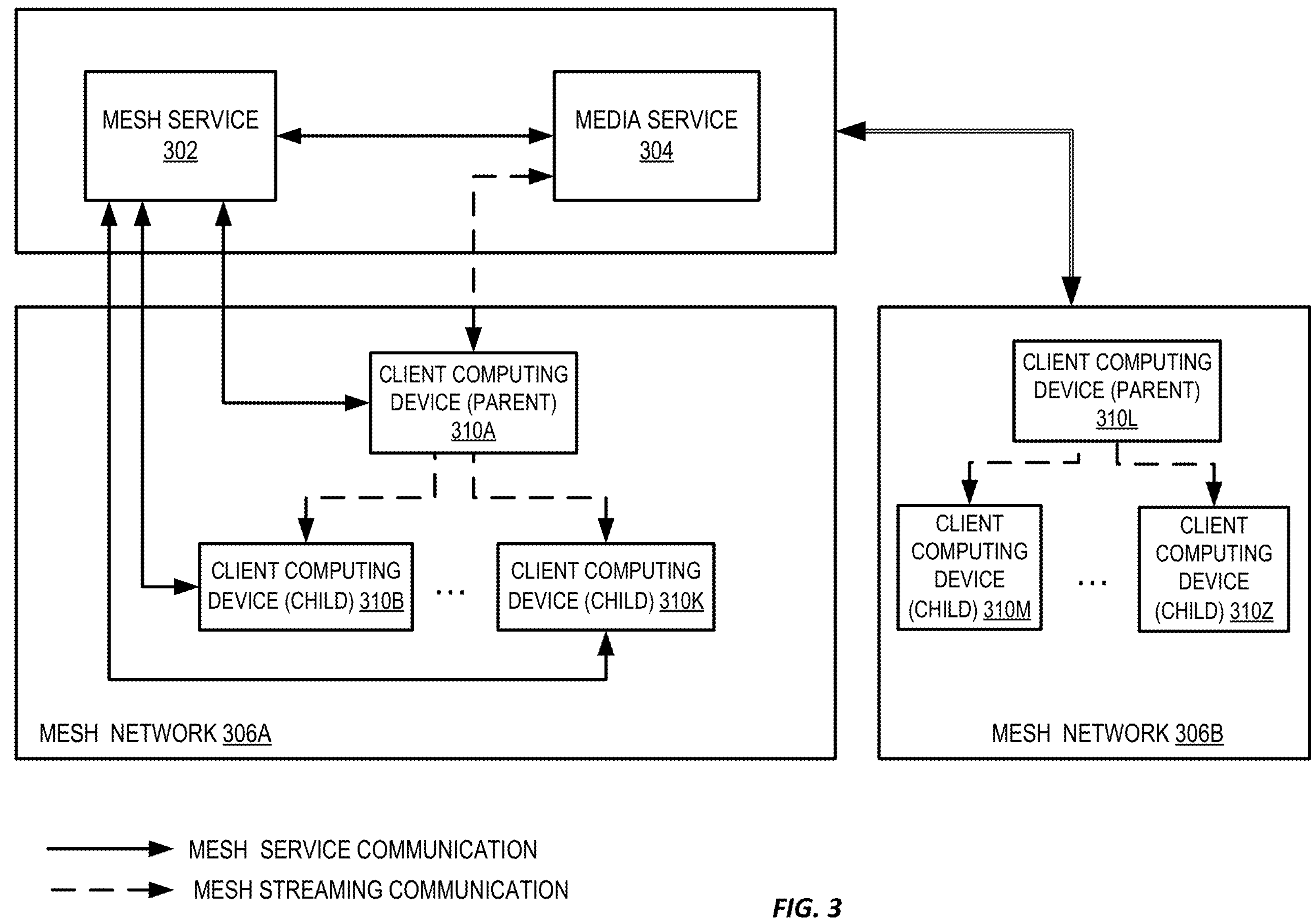
FIG. 3 shows an example of an operating environment for efficient distribution of videoconferencing streams to client computing devices via dynamic mesh technology, according to certain aspects of the present disclosure.

Referring now to FIG. 3, FIG. 3 shows an example of an operating environment 300 for efficient distribution of videoconferencing streams to client computing devices via dynamic mesh technology, according to certain aspects described herein. The operating environment 300 includes a media service 304 configured to host and deliver videoconferencing streams to client computing devices 310A-310Z (which may be referred to herein individually as a client computing device 310 or collectively as the client computing devices 310). The video conferencing streams may include media streams of participants of the video conference. A media stream for a participant can include a video stream containing the video of the participant, an audio stream containing the audio of the participant, and other streams regarding the participant. The video conferencing streams can further include a content share stream containing the content shared by one participant with other participants and an overlay content stream containing annotations and markups generated during the video conference on a shared screen. The media service 304 may be the real-time media 212 discussed above with respect to FIG. 2. The client computing devices may be the client devices 140-180 and 220-250 discussed above with respect to FIGS. 1 and 2.

The operating environment 300 further includes a mesh service 302 configured to establish and maintain one or more mesh networks for the client computing devices 310. To establish the mesh networks, each client computing device 310 transmits network information to the mesh service 302. The network information can include IP address of the client computing devices 310, the subnet of the client computing devices 310, and so on. Further, each client computing device 310 can explore its neighbors by sending multicast packets and receiving responses to the multicast packets. The multicast responses received by the sending device can be used to determine the condition of the connection between the sending client computing device and receiving client computing device, such as quality of links, latency, packet loss, connectivity, and so on. Based on the condition of the connection, the network distance (e.g., the number of hops on the shortest path between two devices) and latency between the sending device and each receiving device can be determined. Each client computing device 310 can be configured to send the multicast responses to the mesh service 302 periodically so that the mesh service 302 can dynamically determine a topology map indicating the network locations of the client computing devices 310. For client computing devices 310 that did not send multicast responses, the mesh service 302 can use the network information to determine their locations within the network.

Based on the determined locations of the client computing devices 310, the mesh service 302 can identify client computing devices 310 that are in a same local network and build a mesh network for those client computing devices 310. As shown in the example of FIG. 3, client computing devices 310A-310K are identified as being in the same local network and thus is grouped into one mesh network 306A. Likewise, client computing devices 310L-310Z are identified as being in the same local network and are grouped into another mesh network 306B. Additional mesh networks may be constructed for other client computing devices 310 depending on their locations. Mesh networks may be referred to herein individually as a mesh network 306 or collectively as the mesh networks 306.

For each mesh network 306, the mesh service 302 further selects a client computing device 310 as the parent client computing device (also referred to as "parent node") and the remaining client computing devices are the child client computing device of the mesh network 306 (also referred to as "child nodes"). In the example shown in FIG. 3, client computing device 310A is elected as the parent node for mesh network 306A and client computing device 310L is elected as the parent node for mesh network 306B, while client computing device 310B-K and 310M-310Z are child nodes.

The parent node can be selected based on the configuration of the client computing devices 310 in the mesh network. For example, each client computing device 310 can be configured to transmit the device information including system configuration to the mesh service 302, such as the CPU type, memory size, hard disk, network type and configuration (e.g., local simultaneous download limit). By comparing the system configurations of the client computing devices 310 in a mesh network 306, the mesh service 302 can select a client computing device 310 that meets a pre-determined criteria for a parent node (e.g., having computing power and storage space higher than a threshold value) as the parent node for the mesh network. In some implementations, the criteria can be specified through an administrator portal. The criteria may further specify certain client computing devices 310 are excluded from being selected as a parent node, such as a client computing device 310 associated with an executive of the organization. In some examples, the mesh service 302 determines the mesh network based on a ratio between the parent node and the child nodes. For example, if a mesh network has a parent-to-child ratio smaller than a threshold (i.e., there are too many child nodes per parent node), the mesh service 302 can split the mesh network into two or more mesh networks.

In some examples, the parent node is the primary parent node of the mesh network. The mesh service 302 further identifies one or two secondary parent nodes for the mesh network so that a secondary parent node can be promoted to the primary parent node when the primary parent node becomes unavailable. If there is a parent node becoming unavailable, the mesh service 302 elects another client computing device 310 as the parent node so that the total number of parent nodes (including primary parent node and secondary parent nodes) remains the same. The mesh service 302 further notifies the client computing devices 310 in the mesh network 306 their respective roles in the mesh network 306. FIG. 3 further shows that some of the videoconferencing streams may be distributed via the mesh networks while others are streamed directly from the media service 304. Additional details regarding distributing video conferencing streams will be described below respect to FIGS. 4-8.

Furthermore, the mesh service 302 can be configured to dynamically update the mesh networks 306 based on the information provided by the client computing devices 310, for example, by redefining the mesh networks 306, selecting new parent nodes for an existing mesh network 306, and so on. In scenarios where the primary parent node is unavailable, the child nodes can be configured to restart the streaming from the secondary parent node. If no parent node in the mesh network is available, the child nodes can be configured to stream the video conferencing streams directly from the media service 304. The child node can determine that the parent node is unavailable by detecting that the parent node does not respond to its request. Alternatively, or additionally, the child node can determine that the parent node is unavailable by receiving a message from the mesh service 302 indicating that the parent node is unavailable.

Note that while FIG. 3 only illustrates two mesh networks, fewer or more mesh networks may be established in a similar way as described herein to efficiently distribute the files to client computing devices. The communications among the nodes in each mesh network, the mesh service, and media service are similar to those communications described above with respect to mesh network 306A. Further, the services shown in FIG. 3 are for illustrative purposes only and should not be construed as limiting. Various other services and other arrangements can also be employed to implement the technology described herein.

Figure 4:
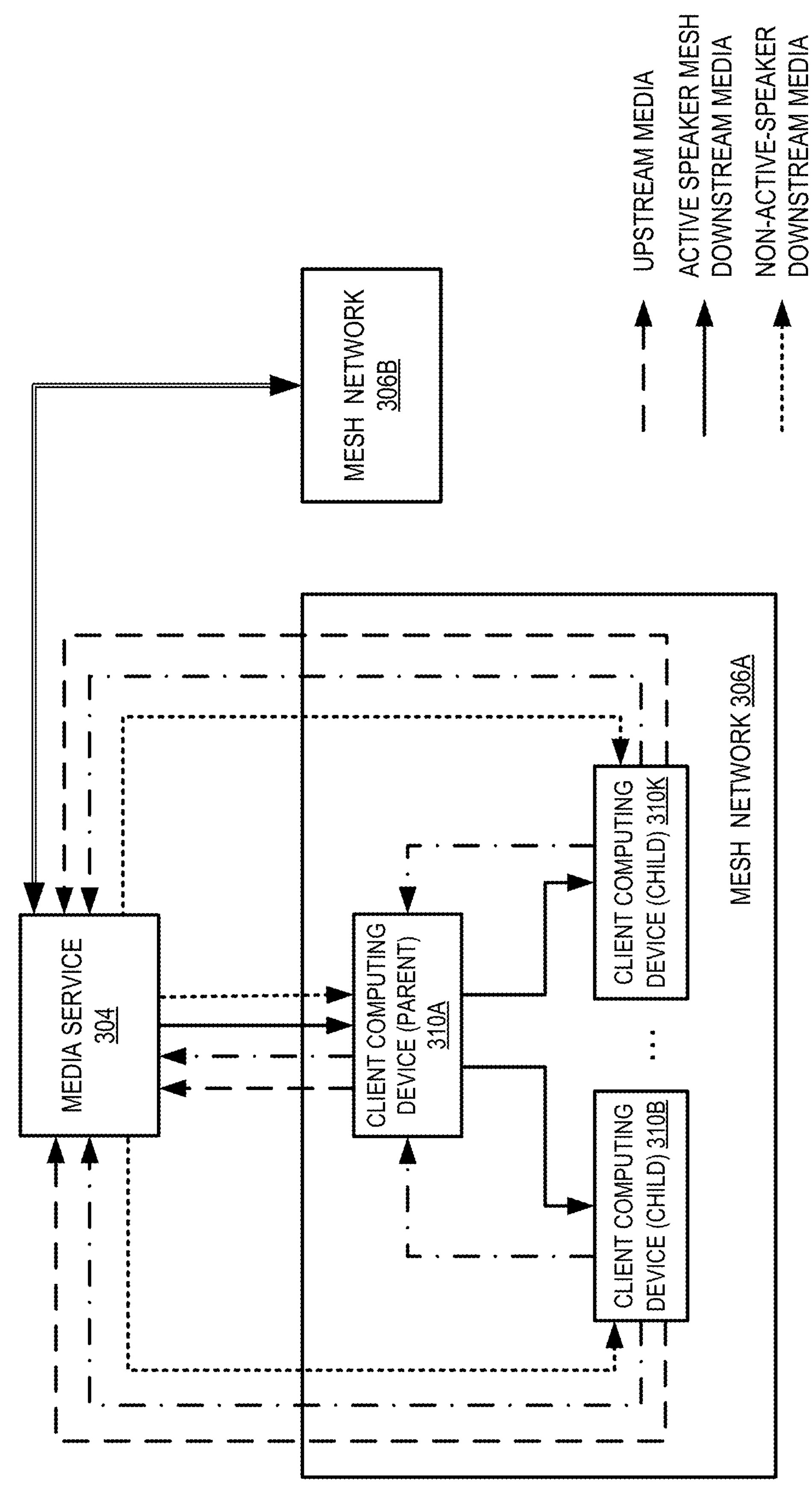
FIG. 4 shows a diagram of example data flows in media stream distribution for videoconferencing via dynamic mesh technology, according to certain aspects of the present disclosure.

Referring now to FIG. 4, FIG. 4 shows a diagram of example data flows in media stream distribution for videoconferencing via dynamic mesh technology, according to certain aspects of the present disclosure. When a video conference starts, the client computing device 310 associated with each participant of the video conference can transmit the media streams of the corresponding participant to the media service 304 as indicated as "upstream media" in FIG. 4. The media streams can include a video stream containing the video of the participant, an audio stream containing the audio of the participant, and other streams. The video stream can include multiple layers with different resolutions, such as 90p, 180p, 360p and 720p. Alternatively, the video stream may be sent in a high resolution such as 1080p. The media service 304 can collect the media streams from the participants and distribute them to other participants based on the respective layout settings in the client computing devices 310.

For example, a client computing device 310 can subscribe to a video stream having a particular resolution based on the layout setting of the video conferencing user interface of the client computing device. The layout settings can include an active speaker mode where the video of the active speaker is displayed with a high resolution in a large window of the user interface while the videos of other participants are displayed at the top or side of the user interface in a smaller resolution. Another example of the layout setting is the gallery mode. The gallery mode shows thumbnail displays of participants, in a grid pattern, which expands and contracts as participants join and leave the meeting. Other layout settings may be utilized. Different layout settings may require video streams in different resolutions for different participants.

Figure 5:
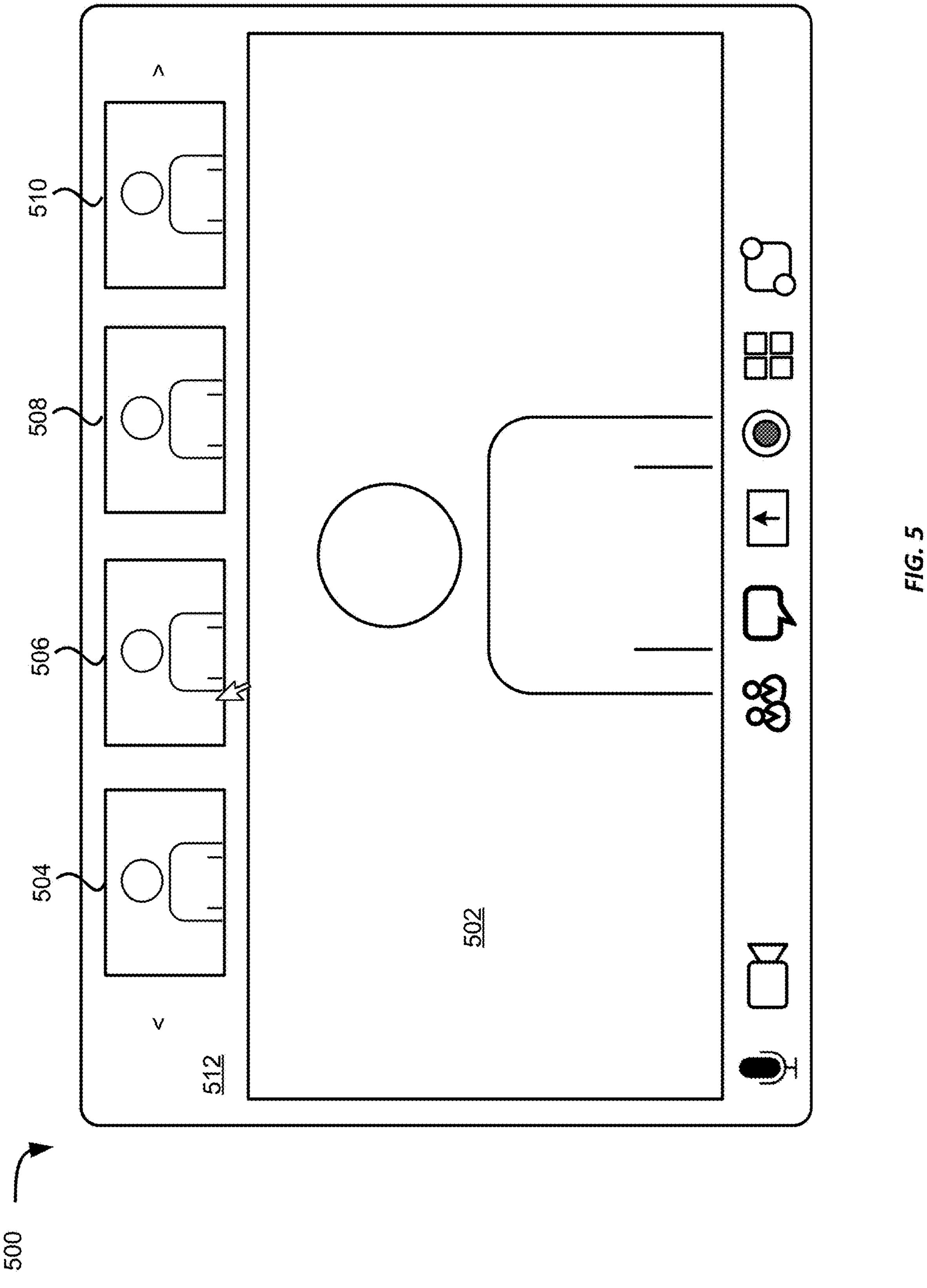
FIG. 5 shows an example of a user interface for a video conference with an active speaker layout shown on a client computing device, according to certain aspects of the present disclosure.

FIG. 5 shows an example of a user interface 500 for a video conference displayed on a client computing device 310 where the layout setting is set to an active speaker mode, according to certain aspects of the present disclosure. The user interface 500 includes a primary display area 502 showing the video of the active speaker (e.g., the participant who is currently speaking) and a secondary display area 512 showing the videos of the remaining participants 504-510. The user interface 500 further includes a tool area at the bottom showing the icons of various tools that can be invoked for the video conferencing, such as the chat tool, the tool for displaying the participant list, the tool for sharing screen, the tool for recording the meeting, and the tools for configuring the microphone and the camera of the client computing device 310. As shown in this example, the video of the active speaker is displayed in a larger window than the videos of other participants and thus requires a higher resolution. When another participant speaks, the video of the other participant will be shown in the primary display area 502 and a high-resolution version of the video will be streamed.

Referring back to FIG. 4, the client computing device 310 can thus request video streams for other participants of the video conference based on the respective resolutions required by the selected layout setting. If the layout is set to an active speaker mode, the client computing device can subscribe to the high resolution of the active speaker video, such as 720p or 1080p depending on which version is available, and low-resolution video streams for remaining participants. Because the active speaker video stream has the high resolution and thus requires a large amount of data to be transmitted compared with other low-resolution video streams, higher network efficiency can be achieved by using mesh networks to distribute the active speaker video stream than other video streams. Note that some of the child nodes may not set the layout to the active speaker mode and thus only require lower resolutions of the active speaker video. To service these child nodes, the parent node can also request the low-resolution video streams of the active speaker from the media service 304. To do so, each child node that needs to receive the active speaker media stream (i.e., the child node is not associated with the active speaker) can subscribe to the active speaker media stream with the parent node (shown as "mesh subscription" in FIG. 4). Based on the subscriptions from the child nodes in the mesh network, the parent node can request all the subscribed active speaker streams by its child nodes from the media service 304 and distribute the active speaker streams to the respective child nodes (shown as "active speaker mesh downstream media" in FIG. 4).

For example, in the mesh network 306A having nine child nodes, four of the child nodes have the active speaker mode, three have the gallery mode of 9 participants, and two have the gallery mode of 25 participants. As a result, the four child nodes would require the high-resolution active speaker video stream such as 720p, the three child nodes would require a middle level resolution of the active speaker video stream such as 180p, and the two child nodes would require the low-resolution video stream such as 90p. The parent node may also require a low-resolution video stream for the active speaker. Based on this information (e.g., provided by the child nodes in their respective subscriptions to the parent node), the parent node can request the 720p, the 180p, and 90p streams of the active speaker video. Note that if only the 1080p video stream of the active speaker is transmitted to the media service 304, the parent node only requests the 1080p stream from the media service 304. The parent node can distribute the 1080p stream to the child nodes where the 1080p stream is displayed (if in the active speaker mode) or down-sampled (if the active speaker mode is not selected). Alternatively, or additionally, the parent node can down-sample the 1080p stream before transmitting it to the child nodes who requested the low or mid-resolution video stream of the active speaker.

For video streams of other participants, the child nodes are configured to stream them directly from the media service as shown in FIG. 4 as "non-active-speaker down-stream media." In some examples, the audio stream of the active speaker is distributed via the mesh networks along with the active speaker video stream. The audio streams of other participants are obtained directly from the media service 304 along with the respective video streams. This process can continue throughout the duration of the video conference as active speakers change.

While the description above focuses on distributing the active speaker media stream via the mesh networks, in some examples, the media streams of one or more other participants can also be distributed via the mesh networks in a similar way.

Figure 6:
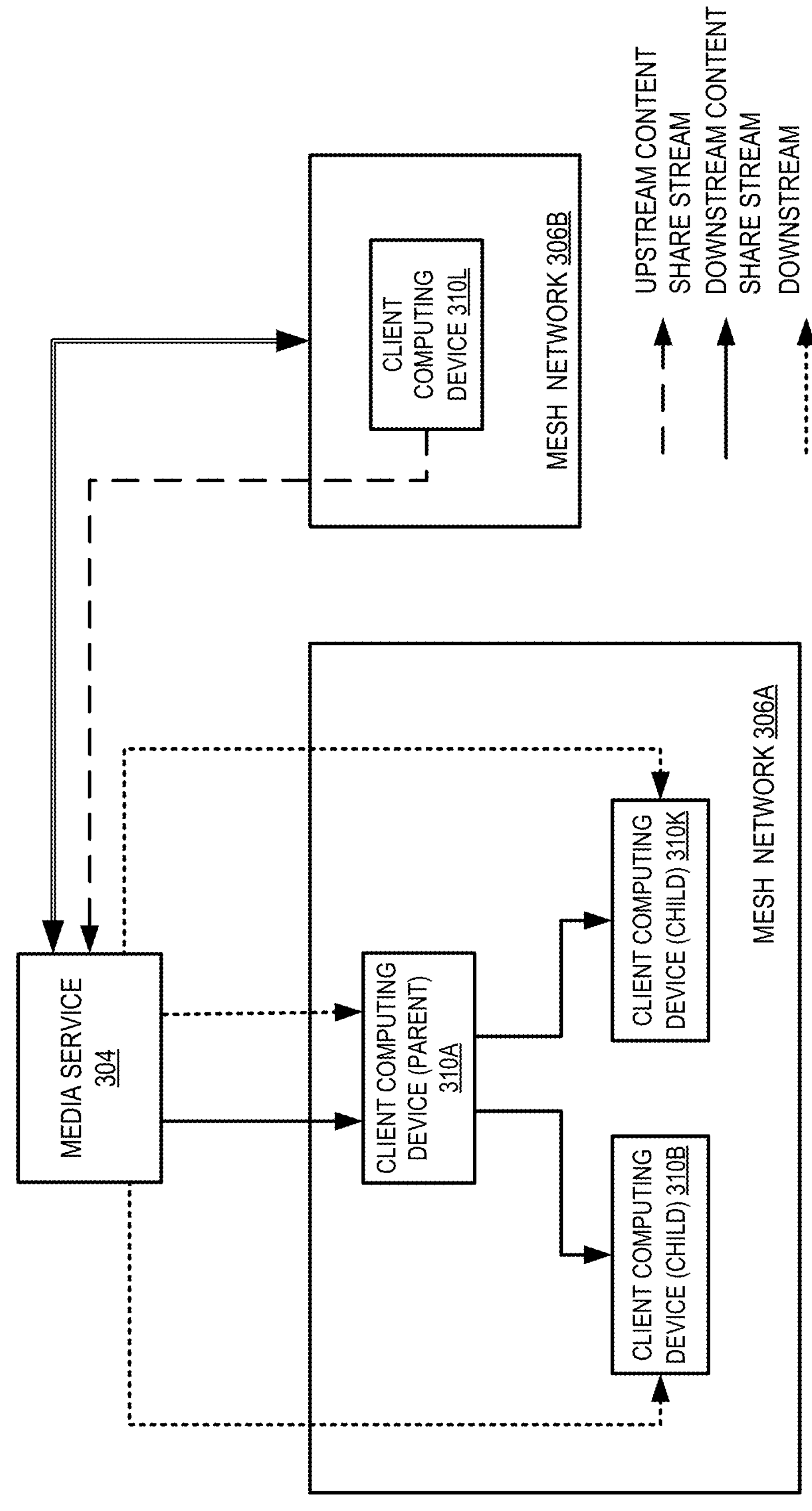
FIG. 6 shows a diagram of example data flows in content share stream distribution for videoconferencing via dynamic mesh technology, according to certain aspects of the present disclosure.

As the video conference is being conducted, one participant may start to share content with other participants. The shared content is transmitted in a content share stream which is common for all meeting participants. Thus, the mesh networks can be utilized to efficiently distribute the content share stream. FIG. 6 shows a diagram of example data flows in content share stream distribution for video conferencing via dynamic mesh technology, according to certain aspects of the present disclosure.

As shown in FIG. 6, to share content, the client computing device 310L associated with the participant who is sharing sends the content share stream to the media service 304 (shown as "upstream content share stream" in FIG. 6). The media service 304 then transmits the content share stream to the parent nodes in the respective mesh networks 306. Each of the parent node can redistribute the content share stream to its child nodes shown as "downstream content share stream" in FIG. 6 (except for the child node that is the sharing device). In the example shown in FIG. 6, the parent node 310A is configured to redistribute the content share stream to each of its child nodes 310B-310K. The parent node of the mesh network 306B where the sharing device is located would not transmit the content share stream to the client computing device 310L as the client computing device 310L is the sharing device. For overlay content, such as the markups and annotation on the shared screen, each client computing device can obtain it directly from the media service (shown as "downstream overlay stream" in FIG. 6). In other examples, the overlay content is also transmitted to the client computing device through the mesh networks 306.

Figure 7:
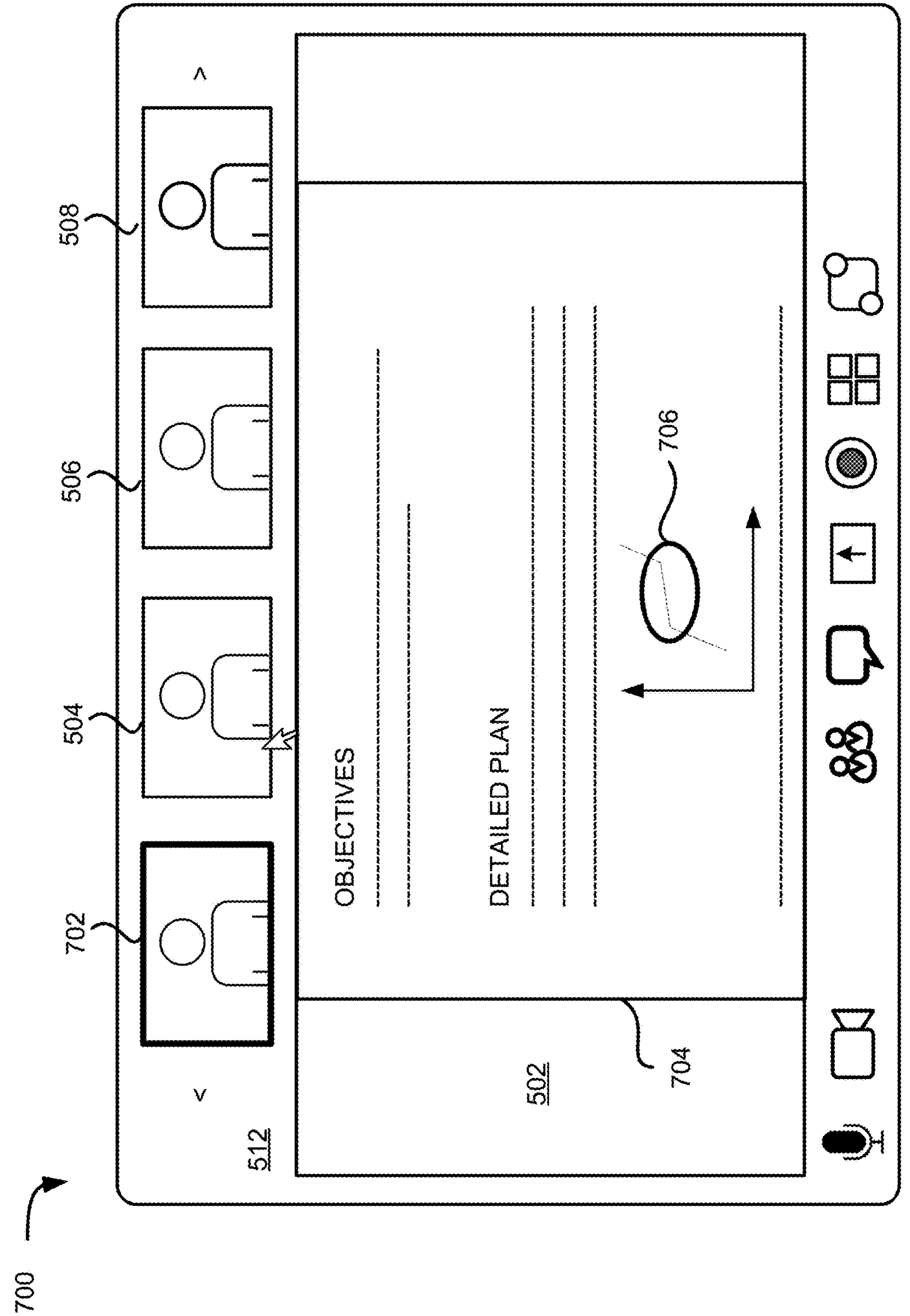
FIG. 7 shows an example of a user interface for a video conference with content sharing enabled shown on a client computing device, according to certain aspects of the present disclosure.

FIG. 7 shows an example of a user interface 700 for a video conference with content sharing enabled, according to certain aspects of the present disclosure. The user interface 700 is based on the user interface 500 shown in FIG. 5. In this example, one of the participants is sharing his/her screen. As a result, the primary display area 502 shows the shared content which is a word processing application 704 showing a document in this example. In addition, some participants may add annotations or markups on the shared screen, such as the circle 706 added to highlight the middle section of the curve shown in the document. As discussed above, the content share stream containing the content of the shared application 704 can be distributed to non-sharing participants via the mesh networks 306. The markup 706 can be distributed to individual non-marking participants by streaming directly from the media service 304. FIG. 7 further shows that the active speaker video 702 is now shown in the secondary display area 512 due to the content sharing feature is enabled. In this case, the client computing device can request a lower resolution of the active speaker video from the parent node of the mesh network.

Figure 8:
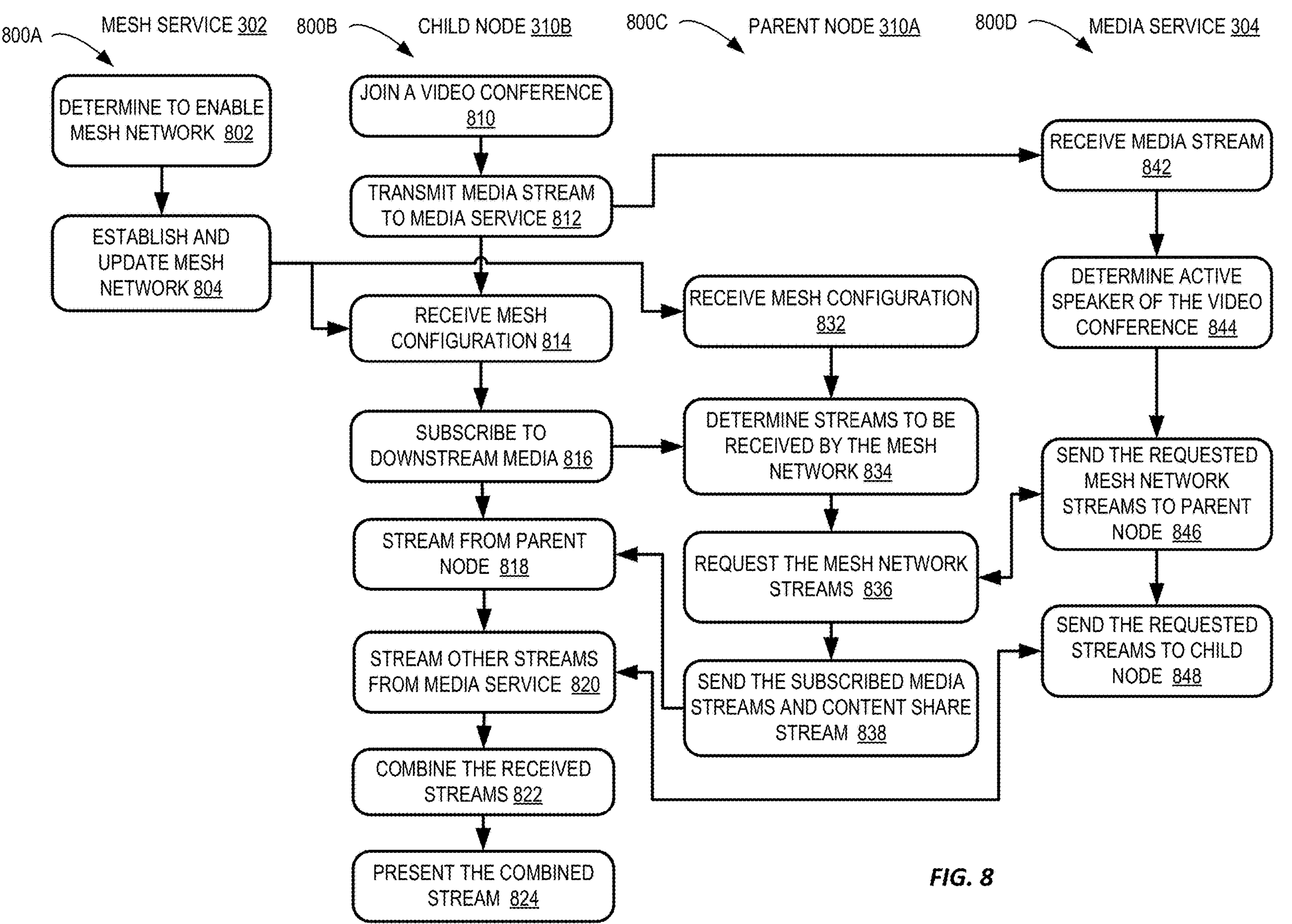
FIG. 8 includes several flow charts depicting several processes for distributing streams of a video conference to client computing devices via dynamic mesh technology, according to certain aspects of the present disclosure.

Referring now to FIG. 8, FIG. 8 includes several flow charts depicting several processes for distributing streams of an ongoing video conference to client computing devices via dynamic mesh technology, according to certain aspects of the present disclosure. The mesh service 302 can be configured to implement process 800A depicted in FIG. 8 by executing suitable program code. A child client computing device 310 (such as child node 310B) can be configured to implement process 800B depicted in FIG. 8 by executing suitable program code (e.g., the videoconferencing software). The parent client computing device 310A can be configured to implement process 800C depicted in FIG. 8 by executing suitable program code (e.g., the videoconferencing software). The media service 304 can be configured to implement process 800D depicted in FIG. 8 by executing suitable program code. Other implementations, however, are possible.

The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order, or some blocks may also be performed in parallel. For illustrative purposes, the process 800A-800D are described with reference to certain examples depicted in the figures. Other implementations, however, are possible. The processes 800A-800D will be described together below.

At block 810, the process 800B involves the child node 310B joining a video conference. At block 812, the process 800B involves the child node 310B transmitting a media stream of the participant associated with the child node to the media service 304. As discussed above, the media stream can include a video stream and an audio stream of the participant. At block 842, the process 800D involves the media service 304 receiving the media stream from the child node 310B and other client computing devices 310. At block 844, the process 800D involves the media service 304 determining the active speaker of the video conference. In some examples, the media service 304 determines the active speaker as the speaker who has the highest volume. Other ways of determining the active speaker can be utilized.

At block 802, the process 800A involves the mesh service 302 determining whether to establish mesh networks to distribute streams for the video conference. In some examples, the mesh service 302 can determine to establish the mesh networks when the number of participants of the video conference exceeds a threshold value. The mesh-network-based stream distribution is more efficient for video conferences with more participants. In further examples, the mesh service 302 determines to enable the mesh networks in response to an instruction received from the media service or another computing device.

If the mesh service 302 determines that the mesh networks should be enabled, at block 804, the process 800A involves the mesh service 302 establishing and updating the mesh networks for the client computing devices 310. The mesh service 302 can determine and update client computing devices 310 to be grouped into mesh networks based on information received from the client computing devices 310 such as the network information (e.g., the IP address and subnet) and multicast responses. As discussed above with respect to FIG. 3, the mesh service 302 can determine, from the multicast responses received by sending devices, the condition of the connection between the sending client computing device and receiving client computing device, such as quality of links, latency loss, connectivity, and so on. Based on the condition of the connection, the network distance and latency between the sending device and each receiving device can be determined and the locations of the client computing devices 310 relative to each other can also be determined. Based on the relative locations of the client computing devices 310, the mesh service 302 can determine which set of client computing devices 310 are in the same local network and thus can be grouped into one mesh network.

For each of the mesh network, the mesh service 302 further selects a client computing device 310 as the parent node of the mesh network 306 ("primary parent node"). The parent node can be selected based on the device information of the client computing devices 310 sent by the client computing devices 310, such as the CPU type, memory size, hard disk of the client computing devices 310. For example, the mesh service 302 can select a client computing device 310 that meets a pre-determined criteria for a parent node (e.g., having sufficient computing power and storage space) as the parent node for the mesh network. In some implementations, the criteria can be specified through an administrator portal. For example, the criteria may specify that a client computing device 310 with location storage larger than a pre-determined amount can be selected as the parent node. The criteria may further specify certain client computing devices 310 are excluded from being elected as a parent node, such as a client computing device 310 associated with an executive of the organization. If the mesh service 302 is able to group two or more client computing devices 310 into a mesh network and to identify a parent node for the mesh network, the mesh network can be established; otherwise, the mesh network is not established.

In some implementations, the mesh service 302 further identifies one or two secondary parent nodes for the mesh network 306 so that a secondary parent node can be promoted to the primary parent node when the primary parent node becomes unavailable. If there is a parent node (primary or secondary) becoming unavailable, the mesh service 302 elects another client computing device 310 as a parent node so that the total number of parent nodes remains the same. The client computing devices 310 that are not elected as a parent node are the child nodes of the mesh network 306.

Establishing mesh networks further include transmitting mesh configuration instructions to client computing devices 310. In some examples, the mesh configuration instructions to each client computing device 310 in a particular mesh network include the roles of all the client computing devices 310 in that particular mesh network. As a result of receiving the mesh configuration instructions, each node in a mesh network is made aware of all the nodes in that mesh network. In other examples, the mesh configuration instructions to a client computing device 310 in a particular mesh network include the role of the client computing device 310 and the primary and secondary parent nodes of that particular mesh network. The mesh configuration instructions to a parent node include the roles of all the client computing devices 310. As a result of receiving the mesh configuration instructions, a parent node is made aware of all the nodes in the mesh network and a child node is made aware of only the primary parent node and secondary parent node(s). Block 804 can be periodically performed to keep the mesh networks updated, such as every 5-10 seconds.

At block 814, the process 800B involves the child node 310B receiving the mesh configuration instructions. Based on the mesh configuration instructions, the child node 310B can identify the parent node 310A in its mesh network. At block 816, the process 800B involving the child node 310B subscribing to videoconferencing streams at the parent node 310A. As discussed above in detail, the child node 310B can subscribe to a particular resolution of the active speaker media stream based on its layout setting. If the content sharing is enabled, the child node 310B can further subscribe to the content share stream with the parent node 310A.

At block 832, the process 800C involves the parent node 310A receiving the mesh configuration instructions. Based on the mesh configuration instructions, the parent node 310A can identify all the child nodes in its mesh network. At block 834, the process 800C involves the parent node 310A determining streams to be received by the client computing devices 310 in the mesh network. The parent node 310A can make the determination based on the subscriptions to streams submitted by the child nodes. For instance, the parent node 310A can determine that the nodes in the mesh network would need the active speaker video stream at resolution 180p, 360p, and 720p, the active speaker audio stream, and the content share stream. The collection of the streams that are required by nodes in a mesh network is also referred to as "mesh network streams." At block 836, the process 800C involves the parent node 310A requesting the mesh network streams from the media service 304. At block 846, the process 800D involves the media service 304 sending the requested mesh network streams to the parent node 310A. At block 848, the process 800D involves the media service 304 sending other streams to the child node 310B as requested by the child node 310B.

At block 838, the process 800C involves the parent node 310A transmitting the subscribed media stream of the active speaker and the content share stream, if there is any, to the child node 310B. At block 818, the process 800B involves the child node 310B streaming (i.e., receiving via streaming) the streams from the parent node 310A. At block 820, the process 800B involves the child node 310B streaming (i.e., receiving via streaming) other streams from the media service 304, such as the media streams of the participants other than the active speaker, the overlay stream, and so on. As used herein, streaming refers to sending and receiving data in a continuous flow over a computer network, from one device to another. Thus, streaming can be a receive-side operation (e.g., receiving and processing the data in the continuous flow) as well as a transmit-side operation (transmitting the data in the continuous flow). The child node streaming from the parent node is a receive-side operation while the parent node streaming to the child node is a transmit-side operation.

At block 822, the process 800B involves the child node 310B combining the received streams. For example, the child node 310B may synchronize the different streams so that the content of different streams is presented according to the same timeline. For instance, the active speaker video stream (streamed from the parent node 310A) needs to be synchronized with the video streams of other participants (streamed from the media service 304). Because these two streams come from different network routes which have different network delays, the arrival times of the corresponding contents (e.g., the video frames of the participants at meeting time 01:05) in the two streams at the client computing device may be different. To synchronize these two streams, the client computing device may buffer one stream and combine it with the other stream when the corresponding portion of the other stream arrives at the client computing device. Likewise, the content share stream (obtained from the parent node 310A) needs to be synchronized with the overlay stream (obtained from the media service 304). Additionally, the media streams (including the media streams of the active speaker and other participants) and the content share stream and overlay stream also need to be synchronized. At block 824, the process 800B involves presenting the combined stream in the user interface of the video conference on the child node 310B.

It should be understood that while not shown in FIG. 8, the blocks in the process 800B for the child node are also applicable to the parent node 310A, such as blocks 810, 812, and 820-824. In other words, the parent node 310A also performs the operations in those blocks in addition to the operations listed in process 800C. Further, the processes depicted in FIG. 8 are for illustration only and should not be construed as limiting. Various other ways or additional ways to distribute the videoconferencing streams to the client computing devices via the mesh network can be implemented. For example, before the mesh networks are established, each client computing device can subscribe to or otherwise request the streams directly from the mesh service 304. After the mesh networks are built, the mesh service 304 can instruct client computing devices to stream the active speaker media stream or one or more non-active-speaker media streams from their respective parent nodes. Alternatively, or additionally, the client computing device can determine that the mesh network has been established, such as by receiving the mesh configuration instructions, and automatically stream the active speaker media stream or one or more non-active-speaker media streams from the parent node in the mesh network.

Further, if the child node 310B detects that the primary parent node 310A is unavailable, the child node 310B can subscribe to or otherwise request the streams from the secondary parent node in the same mesh network. If the child node 310B detects that no parent node is available in the mesh network, the child node 310B can subscribe to or otherwise request the streams directly from the media service 304. This can be implemented by configuring the child client computing devices, such as by configuring the videoconferencing software, or by instructing the child nodes via instructions sent in the mesh configurations at block 804. Other implementations are also possible.

Figure 9:
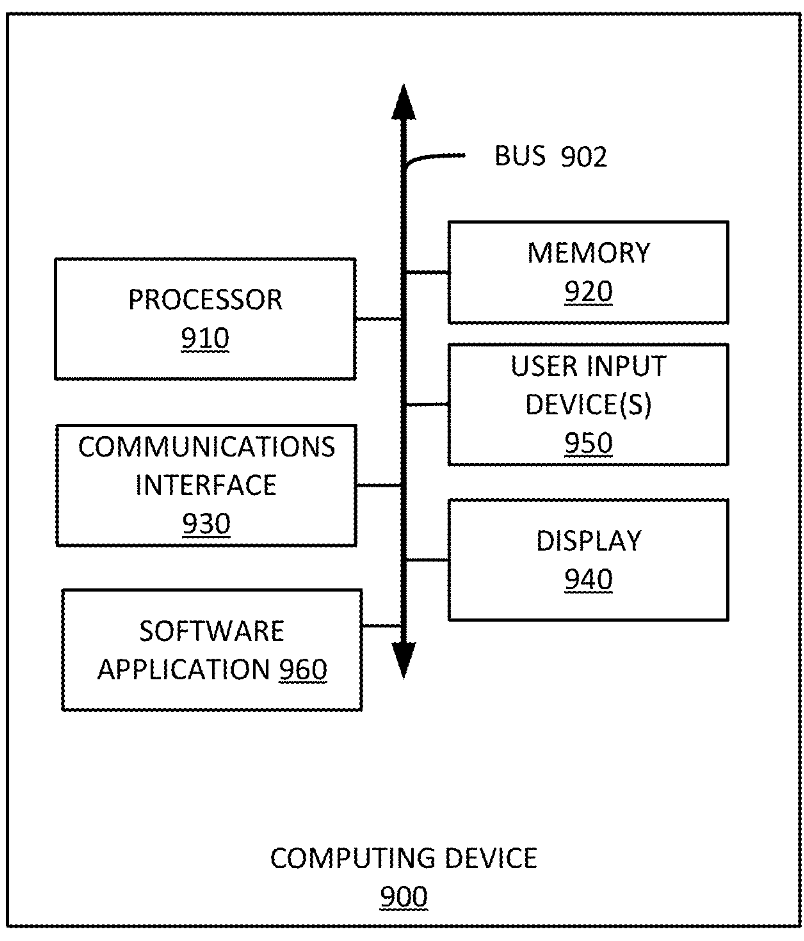
FIG. 9 shows an example computing device suitable for performing certain aspects of the present disclosure.

Referring now to FIG. 9, FIG. 9 shows an example computing device 900 suitable for performing certain aspects of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more processes described herein, such as part or all of the example processes 800A, 800B, 800C, or 800D described above with respect to FIG. 8. For example, the software application 960 provided on the computing device 900 may provide instructions for performing one or more steps of the processes 800A, 800B, 800C, or 800D. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: A method performed by a computing device, the method comprising: joining a video conference involving a plurality of participants associated with respective client computing devices of a plurality of client computing devices, the plurality of client computing devices comprising the computing device; receiving a message indicating the computing device is a child node in a mesh network, the mesh network comprising a parent node and one or more child nodes, the parent node and the one or more child nodes being selected from the plurality of client computing devices and the one or more child nodes comprising the computing device; streaming a first video stream for an active speaker of the video conference from the parent node; and presenting the first video stream in a user interface on the computing device.

Example #2: The method of Example #1, further comprising streaming a content share stream from the parent node, wherein presenting the first video stream on the computing device comprises combining the first video stream and the content share stream and presenting the combined video stream.

Example #3: The method of Examples #1-2, further comprising streaming a second video stream for another participant from a media server configured to host streams for the video conference, wherein presenting the first video stream on the computing device comprises combining the first video stream and the second video stream and presenting the combined video stream.

Example #4: The method of Examples #1-3, wherein the first video stream is determined based on a layout of the user interface of the video conference on the computing device.

Example #5: The method of Examples #1-4, further comprising transmitting a message to the parent node, the message indicating a required resolution of video streams for the computing device based on a layout of the user interface of the video conference on the computing device, the message causing the parent node to stream the first video stream from a media server.

Example #6: The method of Examples #1-5, further comprising: streaming an audio stream of the active speaker along with the first video stream of the active speaker.

Example #7: The method of Examples #1-6, further comprising: determining that the parent node is unavailable; and streaming the first video stream from a secondary parent node of the mesh network.

Example #8: The method of Examples #1-7, further comprising: determining that the active speaker has changed to a new active speaker; and streaming a second video stream for the new active speaker of the video conference from the parent node.

Example #9: The method of Examples #1-8, wherein the parent node is configured to: stream, from a media service, a plurality of video streams of the active speaker in a plurality of resolutions requested by the one or more child nodes.

Example #10: A computing device, comprising: a non-transitory computer-readable medium; and a processor communicatively coupled to the non-transitory computer-readable medium, the processor configured to execute processor-executable instructions stored in the non-transitory computer-readable medium to: join a video conference involving a plurality of participants associated with respective client computing devices of a plurality of client computing devices, the plurality of client computing devices comprising the computing device; receive a message indicating the computing device is a child node in a mesh network, the mesh network comprising a parent node and one or more child nodes, the parent node and the one or more child nodes being selected from the plurality of client computing devices and the one or more child nodes comprising the computing device; stream a first video stream for an active speaker of the video conference from the parent node; and present the first video stream in a user interface of the video conference on the computing device.

Example #11: The computing device of Example #10, wherein the processor is configured to execute the processor-executable instructions stored in the non-transitory computer-readable medium to further stream a content share stream from the parent node, wherein presenting the first video stream on the computing device comprises combining the first video stream and the content share stream and presenting the combined video stream.

Example #12: The computing device of Examples #10-11, wherein the processor is configured to execute the processor-executable instructions stored in the non-transitory computer-readable medium to further stream a second video stream for another participant from a media server configured to host streams for the video conference, wherein presenting the first video stream on the computing device comprises combining the first video stream and the second video stream and presenting the combined video stream.

Example #13: The computing device of Examples #10-12, wherein the processor is configured to execute the processor-executable instructions stored in the non-transitory computer-readable medium to further transmit a message to the parent node, the message indicating a required resolution of video streams for the computing device based on a layout of the user interface of the video conference on the computing device, the message causing the parent node to stream the first video stream from a media server.

Example #14: The computing device of Examples #10-13, wherein the processor is configured to execute the processor-executable instructions stored in the non-transitory computer-readable medium to further: determine that the parent node is unavailable; and stream the first video stream from a secondary parent node of the mesh network.

Example #15: The computing device of Examples #10-14, wherein the parent node is configured to: stream, from a media service, a plurality of video streams of the active speaker in a plurality of resolutions requested by the one or more child nodes.

Example #16: A non-transitory computer-readable medium comprising processor-executable instructions configured to cause one or more processors to: join a video conference involving a plurality of participants associated with respective client computing devices of a plurality of client computing devices, the plurality of client computing devices comprising a computing device that comprises the one or more processors; receive a message indicating the computing device is a child node in a mesh network, the mesh network comprising a parent node and one or more child nodes, the parent node and the one or more child nodes being selected from the plurality of client computing devices and the one or more child nodes comprising the computing device; stream a first video stream for an active speaker of the video conference from the parent node; and present the first video stream in a user interface of the video conference on the computing device.

Example #17: The non-transitory computer-readable medium of Example #16, wherein the processor-executable instructions are configured to cause the one or more processors to further stream a content share stream from the parent node, wherein presenting the first video stream on the computing device comprises combining the first video stream and the content share stream and presenting the combined video stream.

Example #18: The computing device of Examples #16-17, wherein the processor-executable instructions are configured to cause the one or more processors to further stream a second video stream for another participant from a media server configured to host streams for the video conference, wherein presenting the first video stream on the computing device comprises combining the first video stream and the second video stream and presenting the combined video stream.

Example #19: The computing device of Examples #16-18, wherein the processor-executable instructions are configured to cause the one or more processors to further transmit a message to the parent node, the message indicating a required resolution of video streams for the computing device based on a layout of the user interface of the video conference on the computing device, the message causing the parent node to stream the first video stream from a media server.

Example #20: The computing device of Examples #16-19, wherein the processor-executable instructions are configured to cause the one or more processors to further: determine that the parent node is unavailable; and stream the first video stream from a secondary parent node of the mesh network.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by a computing device, the method comprising:

joining a video conference involving a plurality of participants associated with respective client computing devices of a plurality of client computing devices, the plurality of client computing devices comprising the computing device;

receiving a message indicating the computing device is a child node in a mesh network, the mesh network comprising a parent node and one or more child nodes, the parent node and the one or more child nodes being selected from the plurality of client computing devices and the one or more child nodes comprising the computing device;

determining a video resolution for a first video stream;

subscribing to the first video stream according to the video resolution at the parent node, the parent node configured to relay the first video stream from the video conference to the child node;

streaming the first video stream for an active speaker of the video conference from the parent node; and presenting the first video stream in a user interface on the computing device.

2. The method of claim 1, further comprising streaming a content share stream from the parent node, wherein presenting the first video stream on the computing device comprises combining the first video stream and the content share stream and presenting the combined video stream.

3. The method of claim 1, further comprising streaming a second video stream for another participant from a media server configured to host streams for the video conference, wherein presenting the first video stream on the computing device comprises combining the first video stream and the second video stream and presenting the combined video stream.

4. The method of claim 1, wherein the first video stream is determined based on a layout of the user interface of the video conference on the computing device.

5. The method of claim 1, wherein determining the video resolution for the first video stream is based on a layout of the user interface of the video conference on the computing device.

6. The method of claim 1, further comprising: streaming an audio stream of the active speaker along with the first video stream of the active speaker.

7. The method of claim 1, further comprising:

determining that the parent node is unavailable; and streaming the first video stream from a secondary parent node of the mesh network.

8. The method of claim 1, further comprising:

determining that the active speaker has changed to a new active speaker; and streaming a second video stream for the new active speaker of the video conference from the parent node.

9. The method of claim 1, wherein the parent node is configured to:

stream, from a media service, a plurality of video streams of the active speaker in a plurality of resolutions requested by the one or more child nodes.

10. A computing device, comprising:

a non-transitory computer-readable medium; and a processor communicatively coupled to the non-transitory computer-readable medium, the processor configured to execute processor-executable instructions stored in the non-transitory computer-readable medium to:

join a video conference involving a plurality of participants associated with respective client computing devices of a plurality of client computing devices, the plurality of client computing devices comprising the computing device;

receive a message indicating the computing device is a child node in a mesh network, the mesh network comprising a parent node and one or more child nodes, the parent node and the one or more child nodes being selected from the plurality of client computing devices and the one or more child nodes comprising the computing device;

determine a video resolution for a first video stream;

subscribe to the first video stream according to the video resolution at the parent node, the parent node configured to relay the first video stream from the video conference to the child node;

stream the first video stream for an active speaker of the video conference from the parent node; and present the first video stream in a user interface of the video conference on the computing device.

11. The computing device of claim 10, wherein the processor is configured to execute the processor-executable instructions stored in the non-transitory computer-readable medium to further stream a content share stream from the parent node, wherein presenting the first video stream on the computing device comprises combining the first video stream and the content share stream and presenting the combined video stream.

12. The computing device of claim 10, wherein the processor is configured to execute the processor-executable instructions stored in the non-transitory computer-readable medium to further stream a second video stream for another participant from a media server configured to host streams for the video conference, wherein presenting the first video stream on the computing device comprises combining the first video stream and the second video stream and presenting the combined video stream.

13. The computing device of claim 10, wherein the processor is configured to execute further processor-executable instructions stored in the non-transitory computer-readable medium to determine the video resolution for the first video stream based on a layout of the user interface of the video conference on the computing device.

14. The computing device of claim 10, wherein the processor is configured to execute the processor-executable instructions stored in the non-transitory computer-readable medium to further:

determine that the parent node is unavailable; and stream the first video stream from a secondary parent node of the mesh network.

15. The computing device of claim 10, wherein the parent node is configured to:

stream, from a media service, a plurality of video streams of the active speaker in a plurality of resolutions requested by the one or more child nodes.

16. A non-transitory computer-readable medium comprising processor-executable instructions configured to cause one or more processors to:

join a video conference involving a plurality of participants associated with respective client computing devices of a plurality of client computing devices, the plurality of client computing devices comprising a computing device that comprises the one or more processors;

receive a message indicating the computing device is a child node in a mesh network, the mesh network comprising a parent node and one or more child nodes, the parent node and the one or more child nodes being selected from the plurality of client computing devices and the one or more child nodes comprising the computing device;

determine a video resolution for a first video stream;

subscribe to the first video stream according to the video resolution at the parent node, the parent node configured to relay the first video stream from the video conference to the child node;

stream the first video stream for an active speaker of the video conference from the parent node; and present the first video stream in a user interface of the video conference on the computing device.

17. The non-transitory computer-readable medium of claim 16, further comprising processor-executable instructions configured to cause the one or more processors to stream a content share stream from the parent node, wherein presenting the first video stream on the computing device comprises combining the first video stream and the content share stream and presenting the combined video stream.

18. The non-transitory computer-readable medium of claim 16, further comprising processor-executable instructions configured to cause the one or more processors to stream a second video stream for another participant from a media server configured to host streams for the video conference, wherein presenting the first video stream on the computing device comprises combining the first video stream and the second video stream and presenting the combined video stream.

19. The non-transitory computer-readable medium of claim 16, further comprising processor-executable instructions configured to cause the one or more processors to further determine the video resolution for the first video stream based on a layout of the user interface of the video conference on the computing device.

20. The non-transitory computer-readable medium of claim 16, further comprising processor-executable instructions configured to cause the one or more processors to:

determine that the parent node is unavailable; and stream the first video stream from a secondary parent node of the mesh network.

* * * * *